US010355566B2

(12) United States Patent
Santandrea

(10) Patent No.: US 10,355,566 B2
(45) Date of Patent: Jul. 16, 2019

(54) PRODUCTION LINES FOR PRODUCING CORE COMPONENTS OF DYNAMO ELECTRIC MACHINES

(71) Applicant: ATOP S.p.A., Barberino Val d'Elsa, Florence (IT)

(72) Inventor: Marco Santandrea, Florence (IT)

(73) Assignee: ATOP S.p.A., Barberino Val d'Elsa, Firenze (IT)

( * ) Notice: Subject to any disclaimer, the term of this patent is extended or adjusted under 35 U.S.C. 154(b) by 189 days.

(21) Appl. No.: 14/779,163

(22) PCT Filed: Apr. 4, 2014

(86) PCT No.: PCT/IB2014/060440
§ 371 (c)(1),
(2) Date: Sep. 22, 2015

(87) PCT Pub. No.: WO2014/170790
PCT Pub. Date: Oct. 23, 2014

(65) Prior Publication Data
US 2016/0056695 A1    Feb. 25, 2016

(30) Foreign Application Priority Data

Apr. 19, 2013   (IT) ............................. PI2013A0031

(51) Int. Cl.
*B23P 19/00*   (2006.01)
*H02K 15/00*   (2006.01)
(Continued)

(52) U.S. Cl.
CPC ........... *H02K 15/08* (2013.01); *H02K 15/022* (2013.01)

(58) Field of Classification Search
CPC .... H02K 3/51; H02K 15/022; H02K 15/0006; H02K 15/08
See application file for complete search history.

(56) References Cited

U.S. PATENT DOCUMENTS 3,894,253 A * 7/1975 Willyoung ............... H02K 3/51
                                                        310/61
4,732,338 A * 3/1988 Eminger ............. H02K 15/095
                                                       140/92.1

(Continued)

OTHER PUBLICATIONS

Search Report dated Feb. 28, 2014 for PI2013A000031.
International Search Report dated Jul. 3, 2014 for PCT/IB2014/060440.

*Primary Examiner* — Paul D Kim
(74) *Attorney, Agent, or Firm* — Haley Guiliano LLP; Jeffrey H. Ingerman; Jason S. Ingerman

(57) ABSTRACT

A production line (100,200,300,400) for manufacturing wound core components (10,10') of a dynamo electric machine, comprising a central processing zone (101) provided with at least a winder (104,104') for winding coils (15) to produce wound core components, a downstream processing zone (111) for finishing the wound core components. The production line further comprises a first load and unload device (105) for transferring the core components to be wound to at least a winder (104,104') from a waiting position (103a), or from an upstream transport carrier (108a), located at a first position (G), for transferring core components to be wound from an upstream processing zone (201). The first load and unload device (105) transferring wound core components from the at least a winder (104,104') to a downstream transport carrier (108b), located at a second position (A), for transferring wound core components to the downstream processing zone (111).

14 Claims, 7 Drawing Sheets

(51) Int. Cl.
*H02K 15/08* (2006.01)
*H02K 15/02* (2006.01)

(56) References Cited

U.S. PATENT DOCUMENTS

| | | | | |
|---|---|---|---|---|
| 5,358,432 A * | 10/1994 | Shih | ........................ | H01R 13/17 439/655 |
| 5,680,696 A | 10/1997 | Bonura et al. | | |
| 5,992,009 A * | 11/1999 | Bonura | .................. | H02K 15/00 198/346.2 |
| 6,012,670 A * | 1/2000 | Luciani | .................. | H02K 15/00 242/433.3 |
| 6,280,265 B1 * | 8/2001 | Hopeck | ................ | H01R 4/4881 310/71 |
| 6,347,968 B1 * | 2/2002 | Hamilton | ............. | H01R 13/187 439/801 |
| 6,453,540 B1 * | 9/2002 | Blakelock | .......... | H02K 15/0006 29/598 |
| 6,732,971 B2 * | 5/2004 | Stratico | .................. | H02K 15/00 242/432.6 |
| 2004/0094652 A1 * | 5/2004 | Stratico | .................. | H02K 15/00 242/432.6 |

* cited by examiner

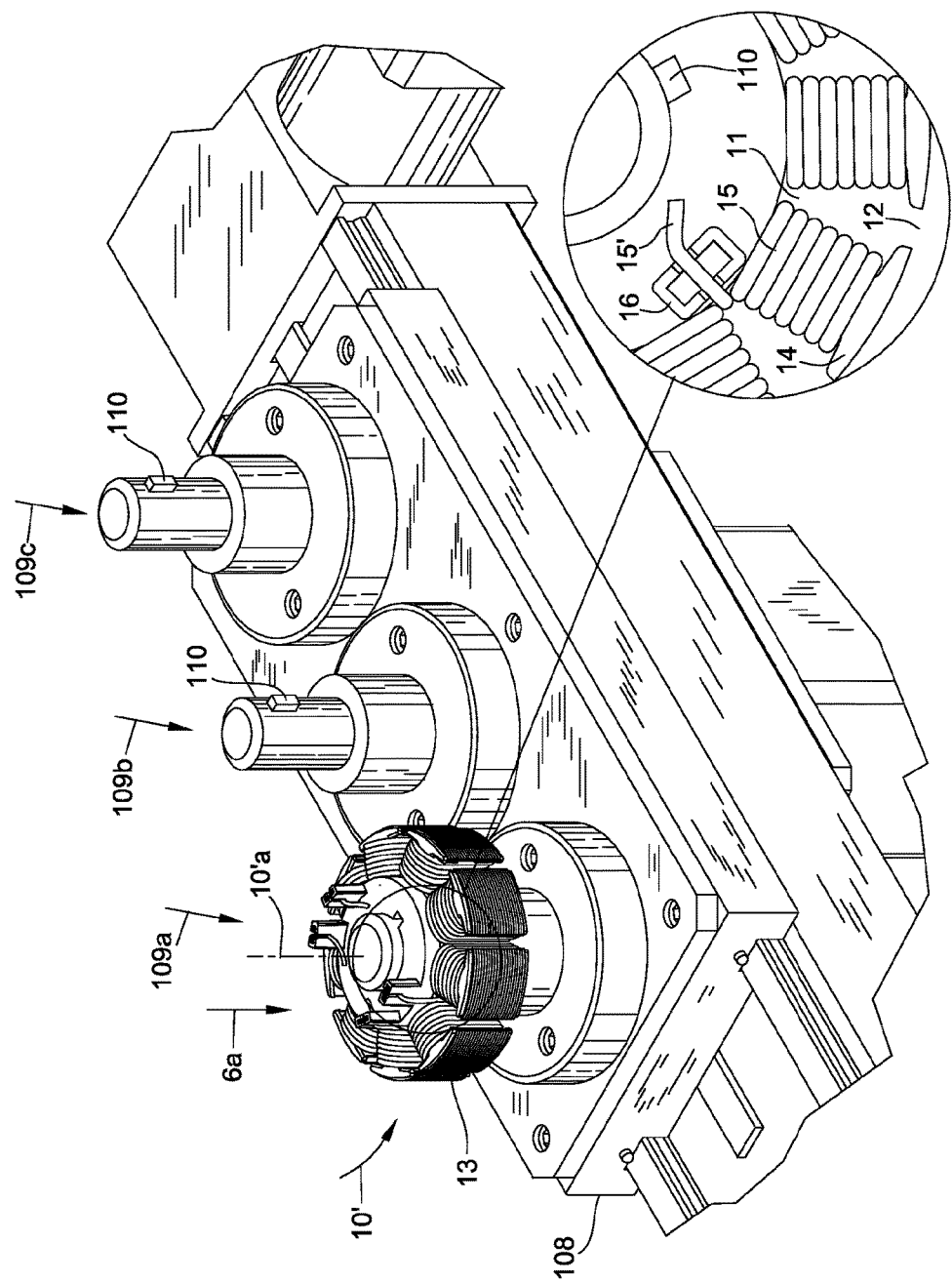

PRODUCTION LINES FOR PRODUCING CORE COMPONENTS OF DYNAMO ELECTRIC MACHINES

FIELD OF THE INVENTION

The invention concerns a production line for manufacturing wound components of dynamo electric machines. More particularly, the invention relates to manufacturing of cores of dynamo electric machines having slots.

BACKGROUND OF THE INVENTION

As known, each pole segment can be wound singularly with one or more electric conductors (in the following also referred to as wire).

As is known, the cores of dynamoelectric machines are formed of a lamination stack having slots for accommodating coils. The slots have openings for the passage of wire conductor during winding to form the coils.

In particular, the openings can be oriented towards the outside of the core component, or towards the centre of the core component.

The first case represents brushless cores wound by using rotating flyers, like is described for example in EP 1,353,435. The second case represents brushless cores wound by using a needle winder, like is described for example in EP 1,076,401.

Production lines for producing these core components usually provide a sequence of operations comprising an assembly stage of sub components on the lamination stack, a stage for winding conducting wire in the slots to form the coils, and a testing stage of the finished component core.

Each of the above mentioned operations normally requires a specific machine, which is located in a respective area of the production line. A production stage where one of the processes is carried out by one or more machines is usually considered to be a workstation of the line. For example, in the winding stage, where the winding machine is slower than machines of other stages, there can be more than one winding machine to form the workstation.

The workstations are normally positioned along a belt conveyor. The belt conveyor moves pallets carrying the core components to the various workstations.

In particular, the pallets rest on the moving belts to be transferred.

At the workstations, the core component can be removed from the pallet to be positioned inside the machine for processing. In other workstations the core components can remain on the pallet during the processing stage.

When processing requires removal from the pallet, normally a load-unload device is present for transfer of the core components between the pallet and the machine.

In particular, a first rectilinear conveyor is provided for moving pallets carrying core components to be processed at the workstations. A second conveyor, which is normally positioned adjacent to the first conveyor on a first side, returns empty pallets to the beginning of the line.

Where work stations have multiple machines, a third conveyor can be foreseen adjacent to the second side of the first conveyor. When a pallet is carrying a core component that needs to be processed by one of the multiple machines, that pallet is shifted from the first conveyor to the third conveyor in order to reach a free machine of the multiple machines, in other words a machine of the multiples machine that is not occupied processing core components.

Conveyors and production lines operating according to these principles have been described in U.S. Pat. No. 4,984,353.

During conveying, the core components are recognized as being processed, or not processed, by means of information which is carried in a data block of a pallet. A data block is read along the conveyor for managing transfer of the pallet, and for requesting specific processing of the core components by the machines. Where necessary, the data block can be updated by writing devices. Reading and writing of the data blocks require stopping the pallets in alignment with the reading or writing devices.

In production lines like those of U.S. Pat. No. 4,984,353, different variations of core components are produced in a same production run. More particularly, the production line is able to output in a same production run core components that differ, for example in size of the core component, or in wire diameter. This mixed production situation requires that the production line processes simultaneously different variations of the core components according to predetermined criteria. The flow of the various variations of core components along the conveyor can become quite random, therefore the data blocks are essential for identifying the variation of the core component that is present on a pallet for specific routing through the machines of the line, which are required for processing.

It is therefore desirable to provide production lines that are improved with respect to those of the prior art that have been described in the foregoing.

SUMMARY OF THE INVENTION

It is thus an object of the present invention to provide a production line that occupies less floor space compared to solutions of the prior art.

It is another object of the present invention to provide a production line where the production capacity can easily be changed by simplifying the addition or removal of machines and the conveying equipment of the line.

It is another object of the present invention to provide a production line where the management of the conveying and the different stages of the production processes can be more easily controlled compared to solutions of the prior art.

It is a further object of the present invention to provide a production line that can produce different variations of a core component within the same production run.

It is another object of the present invention to provide a production line that can be easily converted from one processing configuration to another for processing different variations of core components.

It is another object of the present invention to provide a production line where information can be easily shared amongst the workstations without being dependent on the presence of core components at predetermined locations for reading of information.

These and other aspects of the invention can be accomplished with a production line for manufacturing wound core components of dynamo electric machine as defined by claim 1.

Further characteristics of the invention are indicated in the dependent claims.

BRIEF DESCRIPTION OF THE DRAWINGS

The invention will be now shown with the following description of exemplary embodiments thereof, exemplifying but not limitative, with reference to the attached drawings in which:

FIG. 6 is a view similar to the view of FIG. 5 although showing a different embodiment of the invention;

FIG. 6*a* is an enlarged view of a portion of FIG. 6, as seen from direction 6*a* of FIG. 6;

DETAILED DESCRIPTION OF SOME EXEMPLARY EMBODIMENTS

Figure 3:
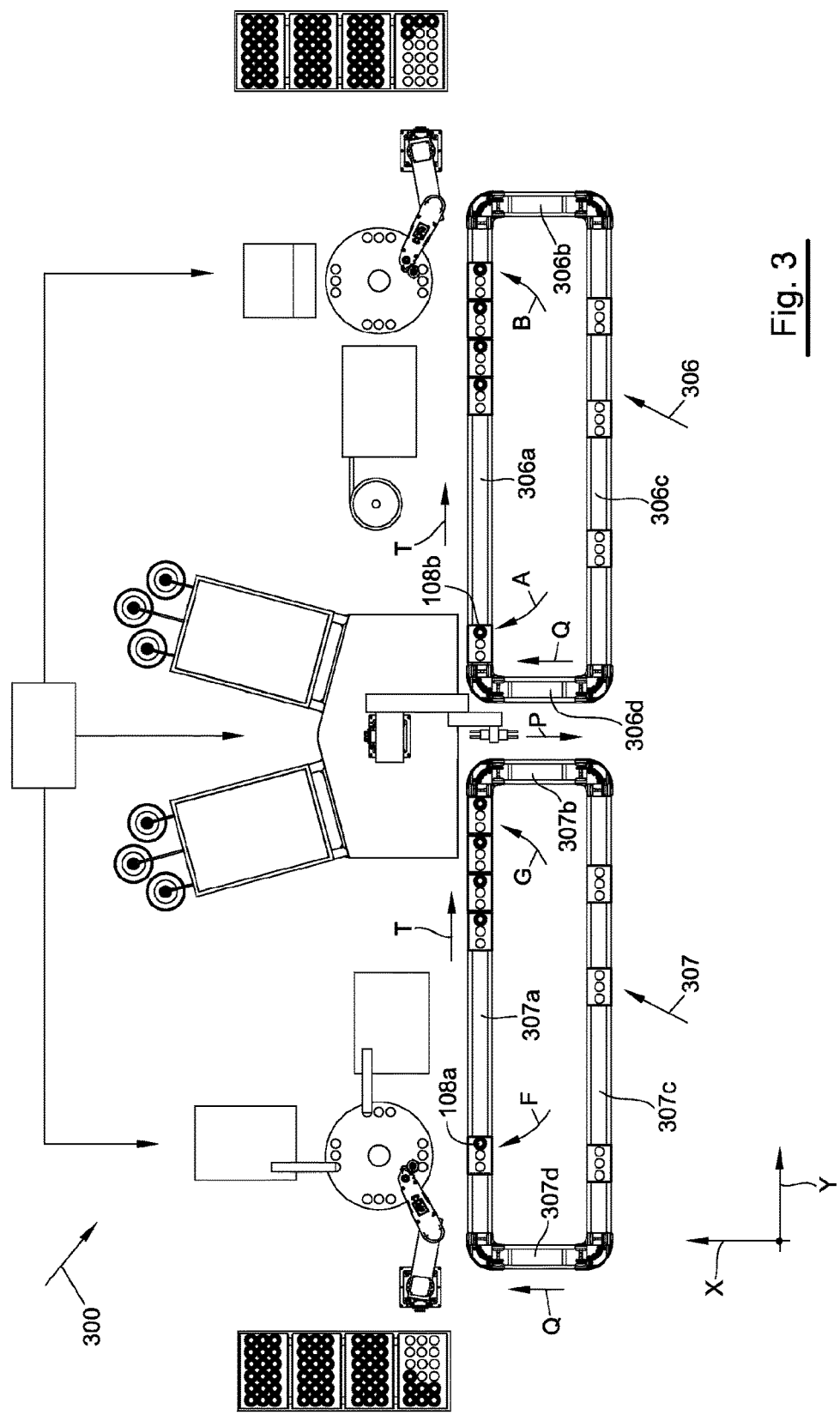
FIG. 3 is a schematic plan view of a third embodiment of a production line according to the invention.
Figure 4:
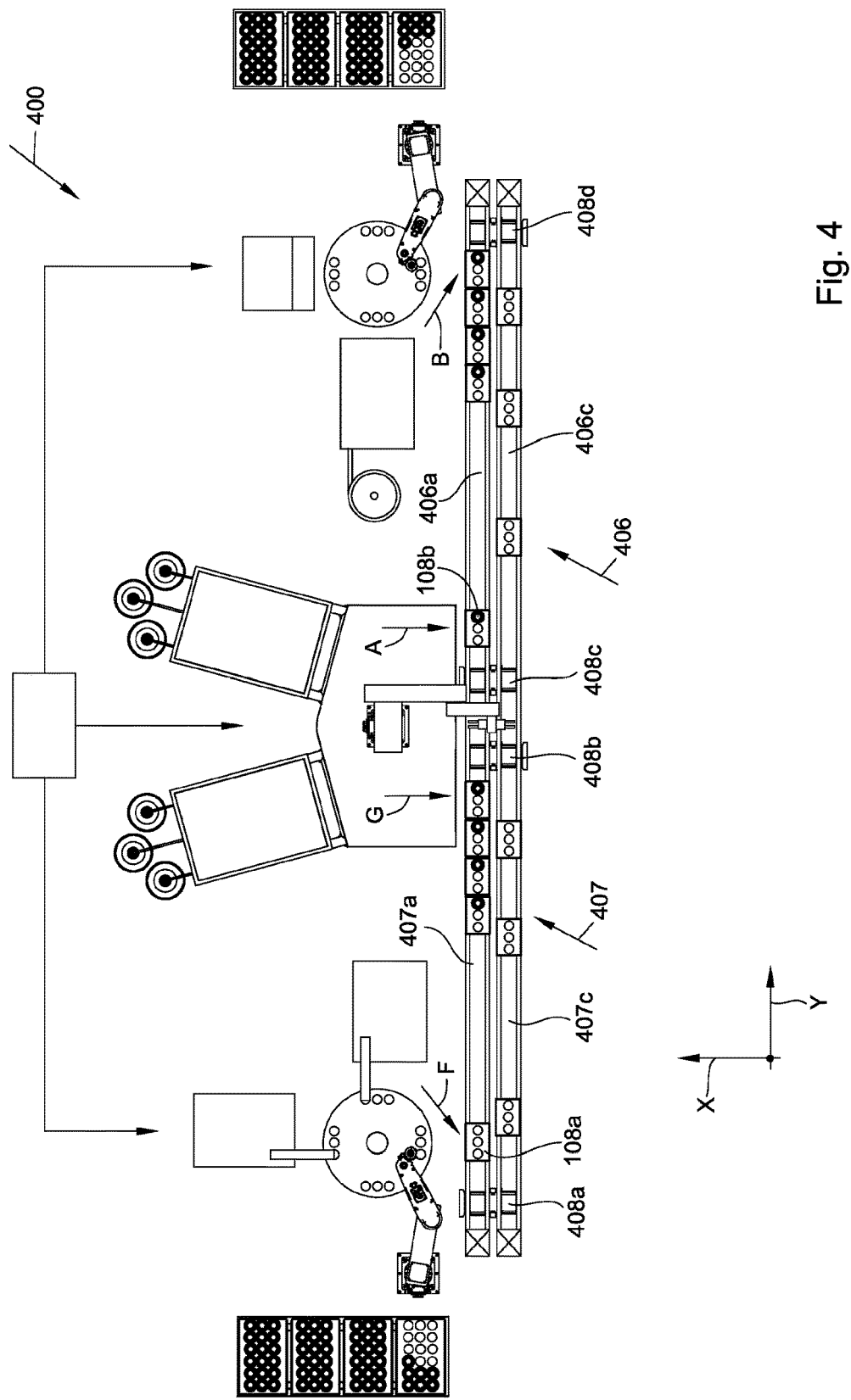
FIG. 4 is a schematic plan view of a fourth embodiment of a production line according to the invention.
Figures 5, 5A:
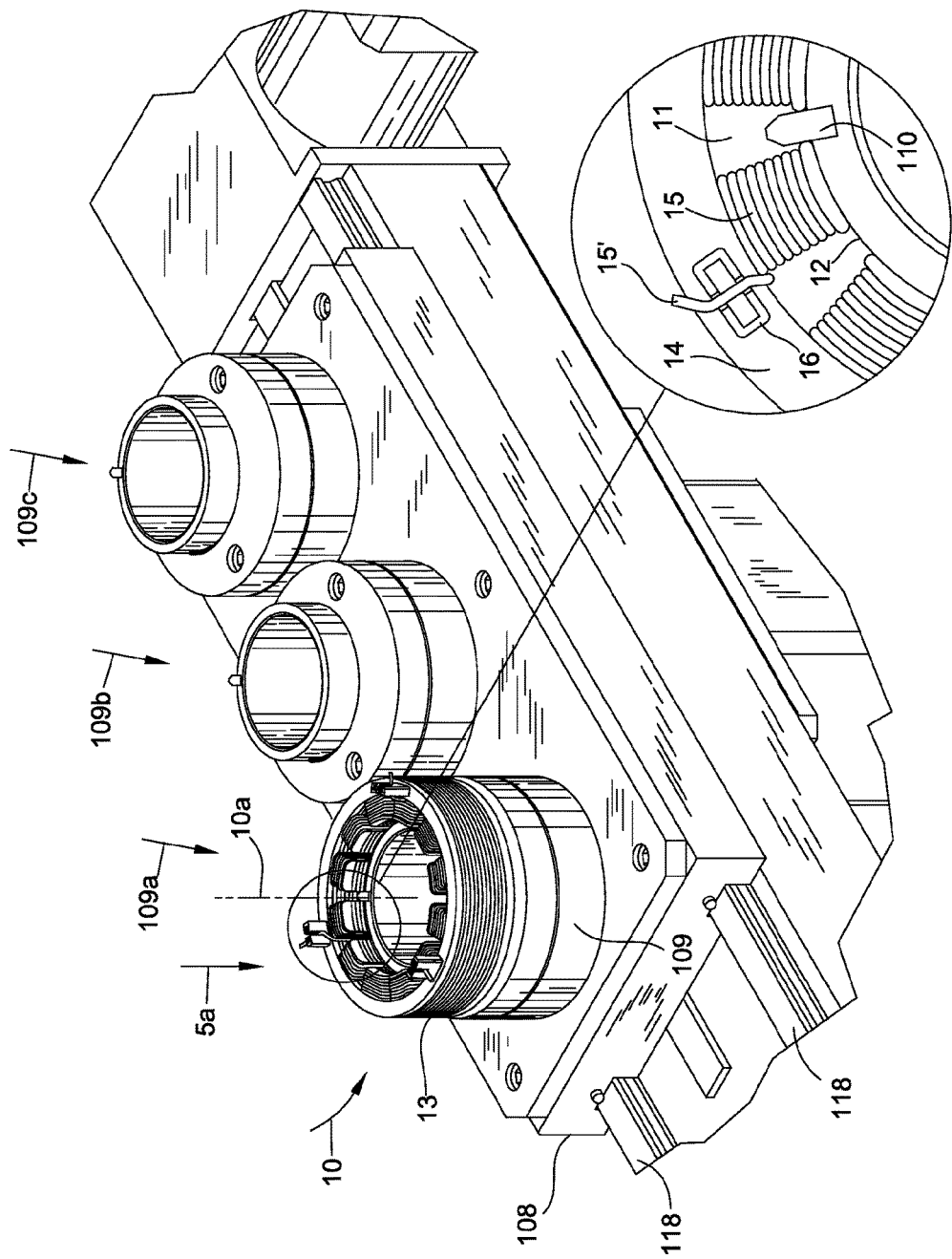
FIG. 5 is a prospective view as seen from the direction 5 of FIG. 1.
FIG. 5*a* is an enlarged view of a portion of FIG. 5, as seen from direction 5*a* of FIG. 5.

The production lines 100, 200, 300, 400 respectively of FIGS. 1, 2, 3, 4 are suitable for producing core components 10 and 10' for brushless motors, like are shown respectively in FIGS. 5 and 6. As shown in FIGS. 5*a* and 6*a*, core components 10 and 10' are provided with slots 11 having openings 12. The openings 12 can either face the centre axis 10*a* of the core component 10, see FIGS. 5 and 5*a*, or can face outwardly with respect to the centre axis 10*a'* of the core component 10', see FIGS. 6 and 6*a*.

In FIGS. 5 and 6 the core components 10 and 10' are shown in a partially finished condition of a certain stage of operation of the production lines of FIGS. 1, 2, 3 and 4. With reference to FIGS. 5 and 6, the lamination stack 13 of core components 10 and 10' has been provided with insulation boards 14. Furthermore, coils 15 of wire conductor have been wound around the poles and the relative leads 15' of the coils have been inserted in terminal pockets 16. Terminals (not shown) can be inserted in the terminal pockets 16 successively. Finally, core components 10 and 10' can be tested to verify electrical properties that are influenced by the production operations that have been performed along the production lines of FIGS. 1, 2, 3 and 4.

Figures 1, 1A:
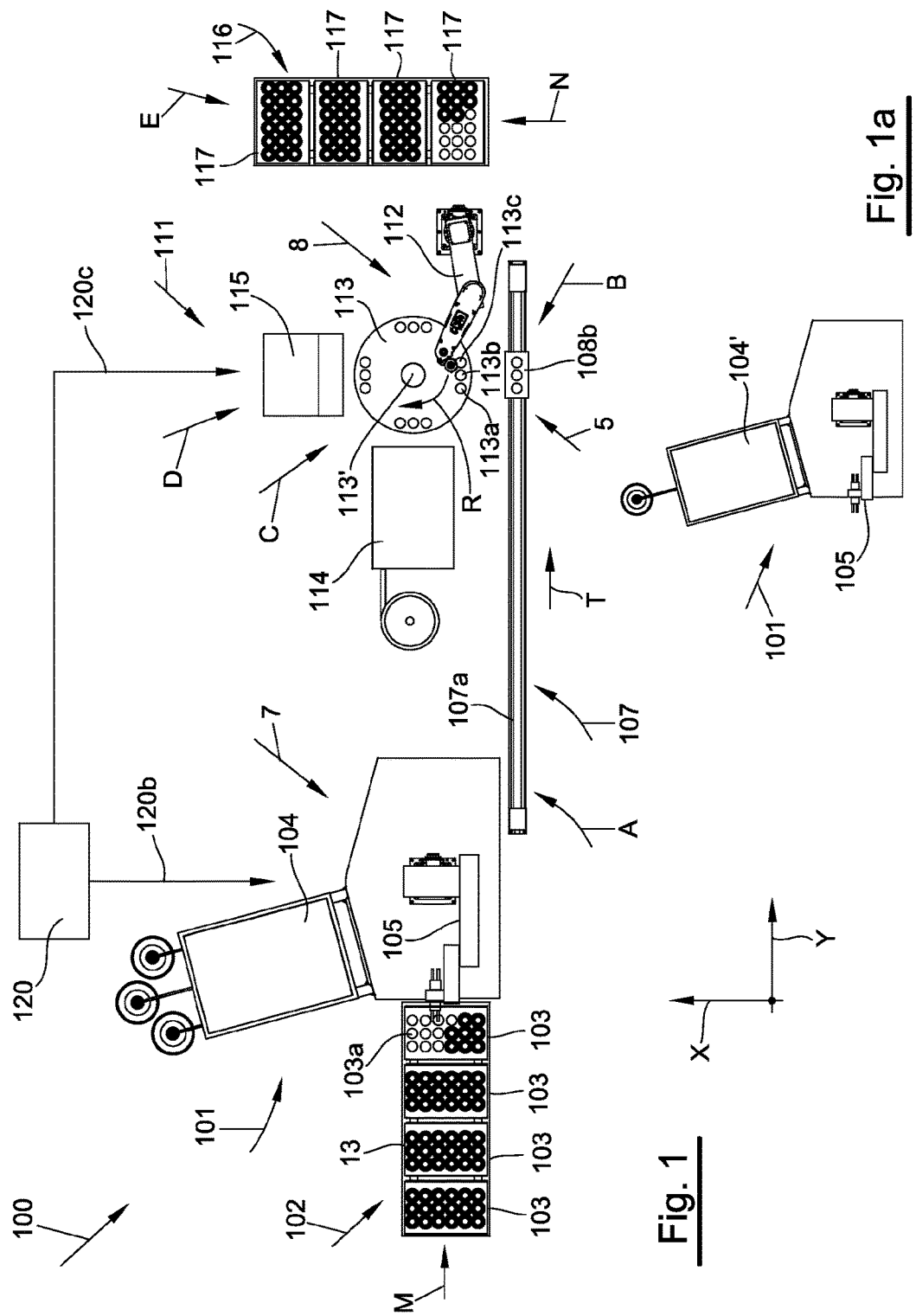
FIG. 1 is a schematic plan view of a first embodiment of a production line according to the invention.
FIG. 1*a* is partial view of a workstation of FIG. 1, where the workstation has been modified with respect to the view of FIG. 1.

By using the production line 100 of FIG. 1, core components like 10 of FIG. 5 can be produced. By using principles which are similar to those of the production line of FIG. 1, also core component like 10' of FIG. 6 can be produced.

With reference to FIG. 1 and FIG. 5, work zone 101, or central work zone of the production line 100, can be provided with a store 102 for supplying unwound lamination stacks 13 that are already provided with insulation boards 14.

In store 102, trays 103 carrying the lamination stacks 13 can be fed in direction M. A lamination stack 13 is positioned in a predetermined position of a tray 103. A plurality of lamination stacks 13 are arranged on a same tray 103 in rows according to a two perpendicular axis X, Y disposition, as shown. The centre axis 10*a* of a lamination stack, when positioned on a tray, can be substantially parallel to axis Z, i.e. perpendicular to the plane of FIG. 1. A store 102 can be provided with an automatic feeding device that moves the queue of trays 103 in direction M towards position A, i.e. towards the position of a first tray of the queue. Here, the lamination stacks 13 are grasped at a waiting position 103*a* of the queue of trays and transferred to a needle winder 104 for winding of coils 15. When an empty tray 103 is positioned at the beginning of the queue, as a result of transfer to winder 104 of all the lamination stacks, the same empty tray 103, can be removed by a human operator, or by known means, which are not shown for reasons of clarity.

Winder 104 for winding coils 15 can be like those described in WO 2012069911, EP 1,076,401, and in EP 1,191,672. Transfer of a lamination stack 13 from a position 103*a* of tray 103 to a positioning casing (not shown) of winder 104 for winding coils 15 can be accomplished by using, for example, an anthropomorphic robot 105 having 5 degrees of rotational movement, like is shown in FIG. 7.

In particular, the positioning casing of the winder 104 positions and holds the lamination stack 13 with respect to needles of the winding machine. The positioning casing can have a mechanism for indexing the lamination stack around the centre axis 10*a* of the assembled lamination stack in order to position the various poles for winding coils 15 by the needles. The centre axis 10*a* of the assembled lamination stack is normally horizontal when winding occurs, i.e. the centre axis of the core component is parallel to the plane of FIG. 1.

Figure 7:
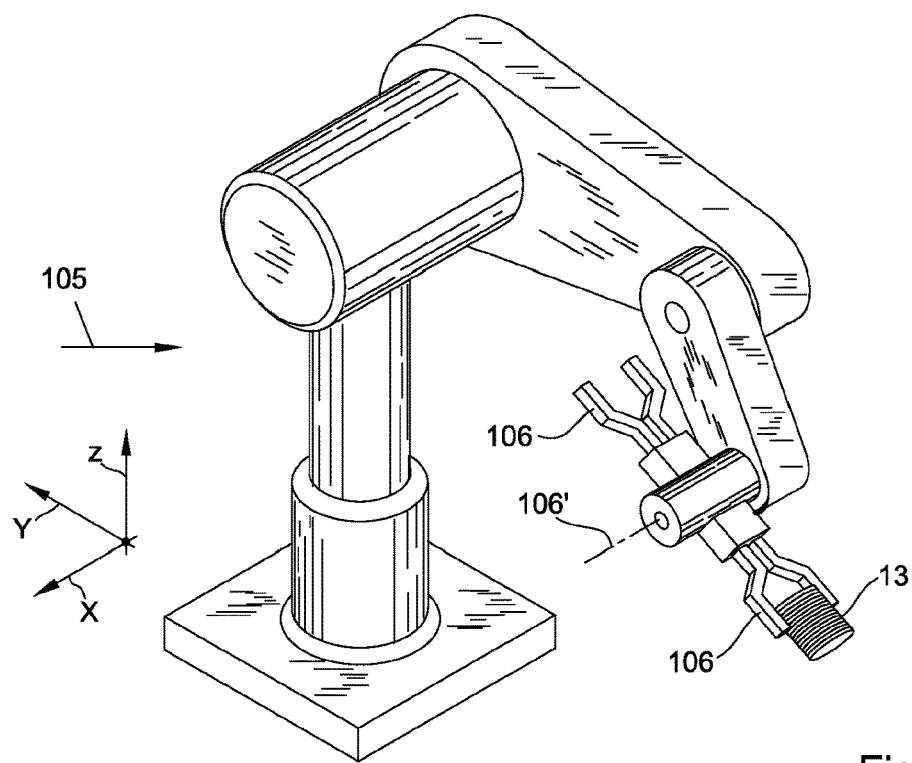
FIG. 7 is a prospective view from direction 7 of FIG. 1.

Robot 105, as shown in FIG. 7, can be provided with two manipulators 106 for grasping the lamination stacks 13. The manipulators 106 can be rotated around axis 106', which is parallel to the plane of FIG. 1.

In particular, one manipulator 106 can be used to remove a lamination stack that has been wound from the positioning casing. The other manipulator 106 can be used to deposit in the positioning casing a lamination stack to be wound, which has been collected from a tray 103. To accomplish this sequence the manipulators can be exchanged in position by rotating them around axis 106'.

FIGS. 5 and 6 show carriers referenced as 108. In the following the carriers will be referred to as 108*a* or 108*b* depending on which area of the line the carriers are used.

A transfer conveyor 107 is located adjacent to work zone 101, so that an empty carrier 108*b* can be located proximate to work zone 101 at position A. In this way, robot 105 can transfer a lamination stack that has been wound with coils 15 (in the following "wound core component") from the positioning casing of winder 104 to a seat 109 of carrier 108*b* (see the condition of FIG. 5). Seat 109 of carrier 108*b* can maintain the wound core component angularly referenced by engagement of tooth 110 in a slot opening 12 (see FIG. 5*a*), as can be required for operations that need to be performed by downstream machines. Accordingly, robot 105 positions the wound core component 10 in seat 109 of carrier 108*b* with the same angular referencing present in winding machine 104, as shown in FIGS. 5 and 5*a*.

Once robot 105 has transferred the wound core component 10 to seat 109, carrier 108*b* can translate in direction T to reach position B, which is proximate to work zone 111, or more particularly, a work zone which is downstream, and around table 113.

Figure 8:
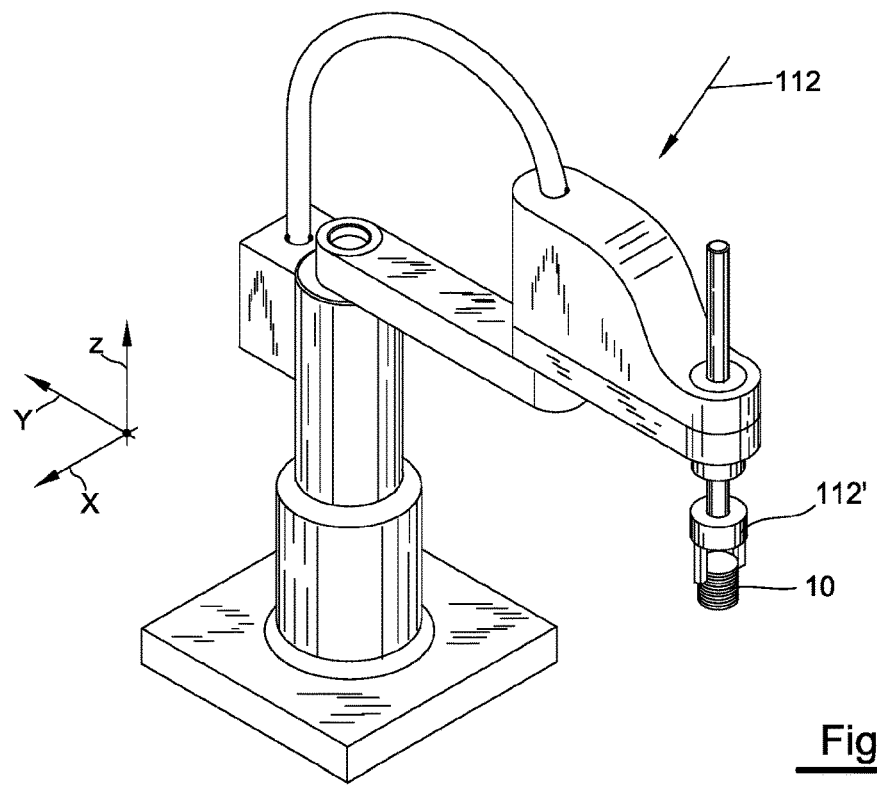
FIG. 8 is a prospective view from direction 8 of FIG. 1.

A robot 112, like the SCARA robot shown in FIG. 8 can transfer a wound core component 10 from the carrier that is in position B to a seat 113*a* of table 113. Robot 112, which is able to move a lamination stack manipulator 112' parallel to the plane of FIG. 1 (coordinates X and Y), and towards and away from the plane of FIG. 1 (coordinate Z) to lift or lower the lamination stack holder 112'.

Once robot 112 has removed a wound core component 10 from seat 109 of carrier 108b, carrier 108b is free to return to position A, for receiving another wound core component 10, by translating in a direction opposite to T on its previous path 107a.

In particular, carrier 108b can translate on linear rails 118 shown in FIG. 5 in direction T, and direction opposite to T. The devices for movement of carrier 108b on linear 118 rails can be similar to the drive belt solutions described in EP 1,722,465.

Seats 113a are positioned on table 113 at 90 degrees from each other, as shown in FIG. 1. For example, seat 113a can be one of multiple seats present on table 113 in the above mentioned positions at 90°, as shown in FIG. 1. More particularly, in the case of FIG. 1, three seats 113a, 113b, 113c are present in each of the positions at 90°.

A terminal application machine 114 can be present at position C around table 113 and a testing machine 115 can be present at position D around table 113, as shown in FIG. 1. Position B, C and D are at 90° from each other around table 113, as shown in FIG. 1.

Table 113 can rotate in direction R around axis 113', which is parallel to axis Z, to sequentially position each of the seats of the table in alignment with positions B, C and D. A programmable drive (not shown) controlled by controls 120 can achieve the alignment of each of the seats of the table with positions B, C and D.

Terminal application machine 114, at position C, assembles terminals in the pockets 16 of the core component where leads 15' have been placed by winding machine 104. Testing machine 115, at position D, verifies the electrical properties of the core component 10 to confirm the quality that production line 100 has achieved by means of the various machine operations. If a core component 10 is determined to have faults it can be classified as a reject and will return to position B with such a classification for controls 120. Accordingly robot 112 can be instructed by controls 120 along a signal line 120c to transfer the reject core component to a specific track (not shown).

A core component that has been considered as passed by testing machine 115 returns to position B. From here, robot 112 transfers the core component to store 116 according to instructions received from controls 120 along signal line 120b. Store 116 is provided with trays 117 for carrying away the finished core components. Each finished core components can be positioned in one of multiple positions of a tray 117. The positions of a tray 117 can be arranged in rows according to a two perpendicular axis X, Y disposition. The lamination store 116 can be provided with an automatic feeding device that moves the queue of trays in direction N towards a take away position E.

If the time taken by carrier 108b to transfer a wound core component 10 from zone 101 to zone 111, and to return to zone 101 to collect another wound core component, is longer than the time taken to make a wound core component available for transfer from zone 101, then a second transfer conveyor (not shown) with a respective carrier like 108b can also be present for transferring the wound core components between zone 101 and zone 111. The second transfer conveyor will be positioned aside and parallel to transfer conveyor 107, and will move its carrier on its respective path like 107a. The movement can be synchronized with the alternative backwards and forwards movement with respect to carrier 108b of transfer conveyor 107. In other words, when carrier 108b of one transfer conveyor is at position B for unloading a wound core component, the carrier of the other transfer conveyor can be at position A for loading a wound core component.

In order to process a core 10' of FIG. 6, by using substantially the same principle of the line of FIG. 1, FIG. 1a shows that a winder 104' using a flyer would need to replace the needle winder 104 of zone 101. Also, carrier 108b would be like the carrier 108 shown in FIGS. 6 and 6a having seats 109 and index tooth 110. Machines 114 and 115 would be suited to process wound core component 10' and trays 103 and 116 would have seats modified to accommodate core component 10'.

Figures 2, 2A:
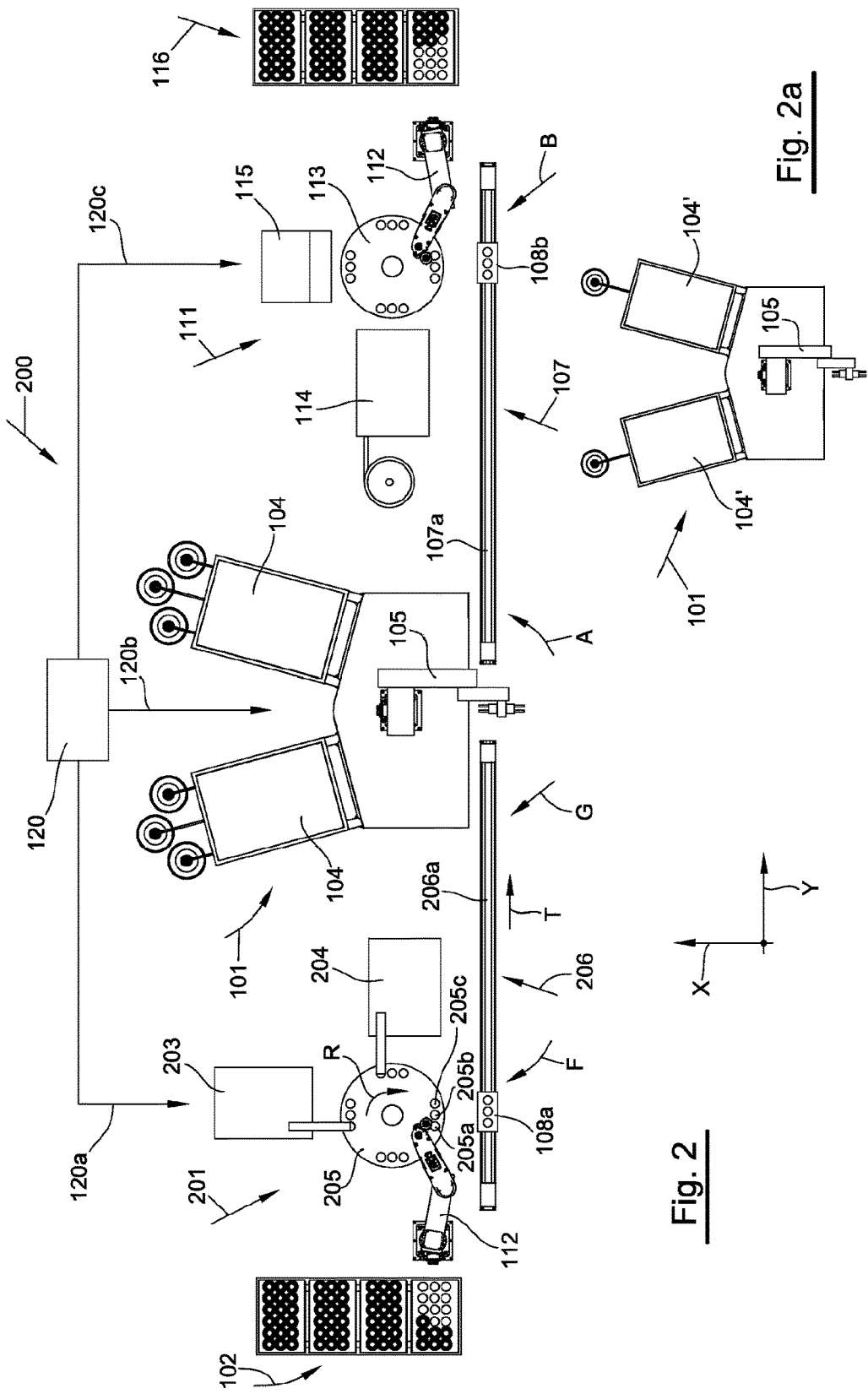
FIG. 2 is a schematic plan view of a second embodiment of a production line according to a second embodiment of the invention.
FIG. 2*a* is a partial view of a workstation of FIG. 2, where the workstation has been modified with respect to the view of FIG. 2.

FIG. 2 shows a production line 200 where assembly operations on lamination stack 13 need to be performed before winding zone 101. More particularly, the lamination stack 13 can require machine assembly of the insulation boards 14 before performing winding in zone 101.

In zone 201 of FIG. 2, or upstream work zone, there can be a store 102 for storing lamination stacks which do not have insulation boards 14.

Furthermore, in zone 201, or upstream working zone, there can be a machine 203 for assembly of an insulation board 14 on one end of lamination stack 13, and a machine 204 for assembly of another insulation end board 14 on the other end of lamination stack 13. Table 205 having seats and positions like table 113 of FIG. 1 can position lamination stacks at machines 203 and 204.

A transfer conveyor 206 is located adjacent to work zone 201 so that a carrier 108a can be located proximate to work zone 201 at position F. Carrier 108a can be similar to carrier 108b shown in FIGS. 5 and 5a.

Another robot 112, like the SCARA robot shown in FIG. 8 can transfer a lamination stack 13 from the store of zone 201 to a seat 205a of table 205, when the seat 205a is located adjacent to position F. The lamination stack can be transferred to machines 203 and 204 by rotation of table 205, like occurs with table 113 of FIG. 1. Once the lamination stack 13 has been assembled with the insulation boards 14 by machines 203 and 204 and has returned adjacent to position F, robot 112 of zone 201 can transfer the assembled lamination stack to a seat 109 of carrier 108a, which is located at position F. Successively, carrier 108a of transfer conveyor 206 can translate in direction T on path 206a to reach position G which is located proximate to work zone 101.

At position G, a robot like 105 of FIG. 1 can transfer the lamination stack to be wound from carrier 108 to a free winder 104 of zone 101. Furthermore, robot 105 can return a wound lamination stack from a winder 104 to a carrier 108b located in position A, like has been described for the production line of FIG. 1. Two winders 104 have been provided in the production line of FIG. 2 to increase the production capacity.

At zone 111 of the production line of FIG. 2, the machines and the functioning principles can be similar to those described with reference to 111 of the production line of FIG. 1.

In order to process a core component like 10' of FIG. 6, by using substantially the same principles of the production line of FIG. 2, as shown in FIG. 2a two winders 104' using respective flyers would need to replace the needle winders 104. Furthermore, carriers 108a and 108b of the production line of FIG. 2 would be like carrier 108 shown in FIGS. 6 and 6a.

The production line of FIG. 3 is similar to the production line of FIG. 2. In the case of FIG. 3, transfer conveyors 206 and 207 have been replaced respectively with transfer conveyors 306 and 307.

Transfer conveyors 306 and 307 are provided with carriers like 108, which recirculate in respective closed paths of transfer conveyors 306 and 307, as shown in FIG. 3. More particularly, the closed path of transfer conveyor 306 is formed of branches 306a, 306b, 306c and 306d, whilst the closed path of transfer conveyor 307 is formed of branches 307a, 307b, 307c and 307d. Carriers 108a and 108b move in direction T respectively on branches 306a and 307a, whilst carriers 108a and 108b move in directions opposite to T respectively on branches 306c and 307c. End branches 306b and 307b are necessary for moving the carriers in direction P to reach branches 306c and 307c, whilst end branches 306d and 307d are necessary for moving carriers in direction Q to reach branches 306a and 307b.

In this way, transfer conveyor 307 moves carriers 108a from position F to position G, whilst transfer conveyor 306 moves carriers 108b from position A to position B. The carriers 108a and 108b move until they are stopped at positions F, G, A and B. Multiple carriers 108a and 108b are present in the transfer conveyors 306 and 307 to be able to satisfy the transfer time required between positions F, G, A and B. Normally the movement means of transfer conveyors can be continuously moving belts extending along the branches.

The carriers 108 rest on the continuously moving belts to be transferred.

A core component like 10' shown in FIG. 6 can be processed using substantially the same functioning principles of the production line of FIG. 3. To process a core component like 10' shown in FIG. 6, the needle winders need to be substituted with two flyer winders.

The production line of FIG. 4 is similar to the production line of FIG. 3, although the closed loops of transfer conveyors 306 and 307, where the carriers 108a and 108b recirculate, have been replaced respectively with transfer conveyors 406 and 407. More particularly, branches 406a and 407a are portions of a single belt conveyor for moving respectively carriers 108b and 108a in direction T. Return branches 406c and 407c are portions of another single belt conveyor for moving respectively carriers 108b and 108a in direction opposite to T. In particular, branch 406a moves carriers 108b from position A to position B, whilst branches 407a moves carriers 108a from position F to position G. Return branch 406c moves carriers 108b from position B to position A, whilst return branches 407c moves carriers 108a from position G to position F. Carrier transfer devices 408a, 408b, 408c, 408d are foreseen near position A, B, F and G for transferring the carriers between the branches. More particularly, transfer device 408a transfers carriers 108a from branch 407c to branch 407a, transfer device 408b transfers carriers 108a from branch 407a to branch 407c, transfer device 408c transfers carriers 108b from branch 406c to branch 406a, transfer device 408d transfers carriers 108b from branch 406a to branch 406c.

In this way carriers 108a recirculate between branch 407a and branch 407c, whilst carriers 108b recirculate between branch 406a and branch 406c.

A core component like 10' shown in FIG. 6 can be processed using substantially the same functioning principles of the production line of FIG. 4. To process a core component like 10' shown in FIG. 6, the needle winders need to be substituted with two flyer winders.

When the production lines of FIGS. 1-4 are required to produce in a same production run core components having different variations, for example different stack size and different wire size, tables 113 and 205 are provided with the multiple seats in the 90° positions. In each of the positions at 90° of table 113 and of table 205 three respective seats 113a-113c and 205a-205c are shown.

Each of the seats 113a-113c and 205a-205c of a determined 90° position can be assigned to receive a specific variation of the core component that needs to be processed. Therefore, the seats can be referred to as variation seats. In other words, and as an example, at a 90° position of the table, one seat will receive a variation A1, the second seat will receive a variation A2 and the third seat will receive a variation A3; A1 being a variation different from A2 and different from A3.

Furthermore, a variation of a core component lamination stack will be present in a specific position of trays 103 of store 102. This information can be stored in controls 120 of the production lines. Robot 112 of zone 201 can receive this information along line 120a to collect a lamination stack as being a specific variation to be processed and that needs to be placed in a specific variation seat of table 205.

Machines 203 and 204 are capable of applying insulation boards for each of the variations. Table 205 is provided with a programmable controlled axis for accomplishing required rotations in direction R. This will allow table 205 to position each of the variation seats of the 90° positions at machines 203 and 204. Table 205 is controlled to rotate according to these positioning requirements based on information received from controls 120, which track the flow of the variation through the production line using signal lines 120a, 120b, 120c.

As shown in FIGS. 5 and 6, carrier 108 can be provided with seats 109a, 109b and 109c. Each of the seats 109a, 109b and 109c can be assigned to receive a specific variation of the core components, therefore also these seats can be referred to as "variations seats". A variation of a core component that was seated in a specific variation seat of table 205 will be transferred to a seat of carrier 108a corresponding to that variation. Controls 120 will instruct robot 112 of zone 201 to accomplish this routine of transfer between the variation seats of table 205 and the variation seats of carrier 108.

Similarly, at position G, controls 120 will instruct robot 105 to transfer a variation present in a seat of the carrier to a specific winder that is capable of winding that variation. Furthermore, controls 120 will instruct robot 105 to transfer a specific wound variation to a respective seat of carrier 108b of transfer conveyor 107.

Similarly, table 113 is provided with a programmable controlled axis for accomplishing required rotations in direction R. This will allow table 113 to position each of seats of the 90° position of table 113 at machines 114 and 115 depending on the variations that need to be processed.

Controls 120 will instruct robot 112 of zone 111 to transfer each of the variations present in the seats of carrier 108b located in position B to a specific variation seat of the 90° positions of table 113.

Machine 114 is capable of applying terminals for each of the variations that have been processed. Table 113 is also provided with a programmable controlled axis for accomplishing required rotations in direction R. This will allow table 113 to position each of the seats of table 113 at machine 114 and at testing machine 115 depending on the variations that needs to be processed. Similarly, robot 112 of zone 111 can position a variation that is finished in a specific position of trays 116.

By using these principles of control 120 it is possible to follow the seats where a variation is placed, and give instructions for where a variation should be seated. Accordingly, it is possible to avoid, or at least reduce, the use of information devices on carriers 108*a* and 108*b* that would need reading and writing operations as described above.

With reference to figures from 1 to 4, it is to be noted that the machines used for performing the various processes, the devices for loading and unloading, together with the conveyors, as used in the lines for producing the core components of dynamoelectric machines according to the present invention, occupy less surface area compared to those necessary in the solutions of the prior art.

The foregoing description of an embodiment of the method and of the apparatus according to the invention will so fully reveal the invention according to the conceptual point of view so that other, by applying current knowledge, will be able to modify and/or adapt in various applications this specific embodiment without further research and without parting from the invention, and, accordingly, it is meant that such adaptations and modifications will have to be considered as equivalent to the exemplified specific embodiment. The means and the materials to realize the different functions described herein could have a different nature without, for this reason, departing from the field of the invention. It is to be understood that the phraseology or terminology that is employed herein is for the purpose of description and not of limitation.

The invention claimed is:

1. A production line for manufacturing wound core components of dynamo electric machine, the production line comprising:
    a central processing zone comprising at least one winder for winding coils to produce the wound core components, the winder having a positioning casing therein for positioning and holding core components to be wound with respect to needles of the winder; and
    a downstream processing zone for finishing the wound core components;
    the production line further comprising:
    a first load and unload device for transferring the core components to be wound directly to the positioning casing from an upstream transport carrier located at a first position; wherein:
    the upstream transport carrier transfers the core components to be wound from an upstream processing zone;
    the first load and unload device transfers the wound core components directly from the positioning casing to a downstream transport carrier located at a second position different from the first position; and
    the downstream transport carrier transfers the wound core components to the downstream processing zone.

2. The production line of claim 1 wherein the upstream transport carrier moves with alternative backwards and forwards motion on a same travel stretch between the upstream processing zone and the central processing zone.

3. The production line of claim 2 wherein the downstream transport carrier moves with alternative backwards and forwards motion on a same travel stretch between the central processing zone and the downstream processing zone.

4. The production line of claim 1 wherein the downstream transport carrier moves with alternative backwards and forwards motion on a same travel stretch between the central processing zone and the downstream processing zone.

5. The production line of claim 1 wherein the upstream transport carrier moves on a recirculation travel conveyor between the upstream processing zone and the central processing zone.

6. The production line of claim 5 wherein the downstream transport carrier moves on a recirculation travel conveyor between the central processing zone and the downstream processing zone.

7. The production line of claim 1 wherein the downstream transport carrier moves on a recirculation travel conveyor between the central processing zone and the downstream processing zone.

8. The production line of claim 1 wherein the central processing zone comprises at least two winders; and
    the first load and unload device transfers unwound core components to the at least two winders.

9. The production line of claim 1 wherein the upstream processing zone comprises:
    a plurality of machines; wherein each machine of the plurality of machines performs a respective production operation on the core components;
    first transfer means for positioning the core components according to a sequence order at the machine; and
    a second load and unload device for transferring the core components from the first transfer means to the upstream transport carrier.

10. The production line of claim 9 wherein the first transfer means comprises at least two seats for transferring the core components to the machines, wherein each of the seats transfers a specific variation of a core component to the machines; and the upstream transport carrier comprises at least two seats for transferring the core components to the central processing zone, wherein each of the seats of the upstream transport carrier transfers a specific variation of a core component.

11. The production line of claim 1 wherein the downstream processing zone comprises:
    a plurality of machines; wherein each machine of the plurality of machines performs a respective production operation on the core components;
    second transfer means for positioning the core components according to a sequence order at the machines of the downstream processing zone; and
    a third load carrier and unload device for transferring the core components from the upstream to the second transfer means.

12. The production line of claim 11 wherein the second transfer means comprises at least two seats for transferring the machines, wherein each of the seats transfers a specific variation of a core component to the machines; and
    the downstream transport carrier comprises at least two seats for transferring the core components to the downstream processing zone, wherein each of the seats of the downstream transport carrier transfers a specific variation of a core component.

13. The production line of claim 10 or 12 comprises control means that determine the production status of a core component at a required instance by computing using which seats are occupied by a variation of a core component and the number of seats occupied by a variation of the core component.

14. The production line of claim 1, wherein the central processing zone comprises at least two winders, wherein one of the winders winds a first variation of a core component and the other winder winds a second variation of a core component.

* * * * *